United States Patent [19]
Dawda et al.

[11] Patent Number: 5,765,845
[45] Date of Patent: Jun. 16, 1998

[54] DURABLE NOISE SUPPRESSING COATING BETWEEN INTERENGAGING ARTICULATING SWIVEL MEMBERS

[75] Inventors: Timothy James Dawda, Royal Oak; Daniel Quinn Houston, Dearborn; Armando Matthew Joaquin, Rochester Hills; Carl Frederick Johnson, Belleville; Matthew John Zaluzec, Canton, all of Mich.

[73] Assignee: Ford Global Technologies, Inc., Dearborn, Mich.

[21] Appl. No.: 742,128

[22] Filed: Oct. 31, 1996

[51] Int. Cl.⁶ .................................................... B62D 5/06
[52] U.S. Cl. .................. 280/95.1; 427/455; 427/456; 252/62
[58] Field of Search ............... 280/89, 95.1, 96.1, 280/673; 427/455, 456; 252/62

[56] References Cited

U.S. PATENT DOCUMENTS

| | | | |
|---|---|---|---|
| 3,086,791 | 4/1963 | Ulinski | 280/95.1 |
| 3,379,455 | 4/1968 | Dahlstrom | 280/89 |
| 4,180,622 | 12/1979 | Burkhard et al. | 428/564 |
| 4,536,003 | 8/1985 | Maurer et al. | 280/95.1 |
| 4,660,845 | 4/1987 | Herr | 280/95.1 |
| 4,997,324 | 3/1991 | Shirai et al. | 409/231 |
| 5,080,056 | 1/1992 | Kramer et al. | 123/193.4 |
| 5,262,206 | 11/1993 | Rangaswamy et al. | 427/447 |
| 5,271,967 | 12/1993 | Kramer et al. | 427/455 |
| 5,334,235 | 8/1994 | Dorfman et al. | 75/255 |
| 5,364,663 | 11/1994 | McCune, Jr. et al. | 427/449 |

*Primary Examiner*—Kenneth R. Rice
*Attorney, Agent, or Firm*—Joseph W. Malleck

[57] ABSTRACT

A method of eliminating scrubbing noise between metal to metal (or metal to ceramic) contact members that experience articulating swiveling interengagement at high force levels in excess of 5,000 psi. The method comprises: (a) preparing the interface to present at least one fresh mechanically adherable stiff surface; (b) thermally spraying a top coating thereonto consisting of at least one of (i) a self-lubricating metal, ceramic material or metal alloy, and (ii) a compliant metal; and (c) placing the coating interface into service to subject it to repeating articulating swiveling contact that functions to microweld the coating to the surface under normal operating conditions.

14 Claims, 3 Drawing Sheets

DURABLE NOISE SUPPRESSING COATING BETWEEN INTERENGAGING ARTICULATING SWIVEL MEMBERS

BACKGROUND OF THE INVENTION

1. Technical Field

This invention relates to the technology of reducing scrubbing noises between metal to metal contact while protecting such contact against corrosion, and more particularly to doing so economically when the metal to metal contact is generated by a high force such as at least 5,000 psi.

2. Discussion Of The Prior Art

No attempt has been made to suppress noise of metal contact by use of thermal spray coatings between non-flat, non-cylindrical hard surfaces (i.e. steel) that are subject to an articulating swiveling interengagement. Instead, the prior art has used thermal spraying to deposit wear resistant coating onto flat or uniform cylindrical aluminum surfaces, using materials such as (i) aluminum that contains $Al_2O_3$, bronze or iron, and (ii) molybdenum that contains aluminum or copper. Materials known for their ability to suppress noise such as epoxy or fiberglass deposits, are unsuitable for solving this problem because of the lack of durability or because such materials may permit corrosion to occur which exaggerates the noise problem.

SUMMARY OF THE INVENTION

It is a primary object of this invention to provide a method that economically and durably eliminates scrubbing noise between metal to metal (or metal to ceramic) contact members that experience articulating swiveling interengagement at high force levels in excess of 5,000 psi, and to do so while exhibiting corrosion resistance.

The method of this invention that meets the above object and provides for a durable noise suppressing coating at an articulating swiveling metal contact interface, comprises: (a) preparing the interface to present at least one fresh mechanically adherable stiff surface; (b) thermally spraying a top coating thereonto consisting of at least one of (i) a self-lubricating metal, ceramic material or metal alloy, and (ii) a compliant metal; and (c) placing the coating interface into service to subject it to repeating articulating swiveling contact that functions to microweld the coating to the surface under normal operating conditions.

The invention, in another aspect is an automotive steering assembly wherein the improvement comprises: (a) a steering spindle that articulatingly swivels about a ball joint fulcrum, the spindle carrying a spindle arm with a steel convex first stop surface at one extremity; (b) a resilient suspension control arm carrying a steel concave second stop surface effective to be scrubbingly engaged by the first stop under a force of at least 5,000 psi; and (c) a thermally sprayed noise-suppressing coating on at least one of said first or second stop surfaces, the coating consisting of at least one of (i) a self lubricating metal, ceramic material or metal alloy, and (ii) a compliant metal.

BRIEF DESCRIPTION OF THE DRAWINGS

FIG. 1 is a perspective view illustrating the front end of an automotive vehicle showing the front wheels in relationship to the vehicle frame, suspension system, and a portion of the steering system related to;

DETAILED DESCRIPTION AND BEST MODE

Figure 1:
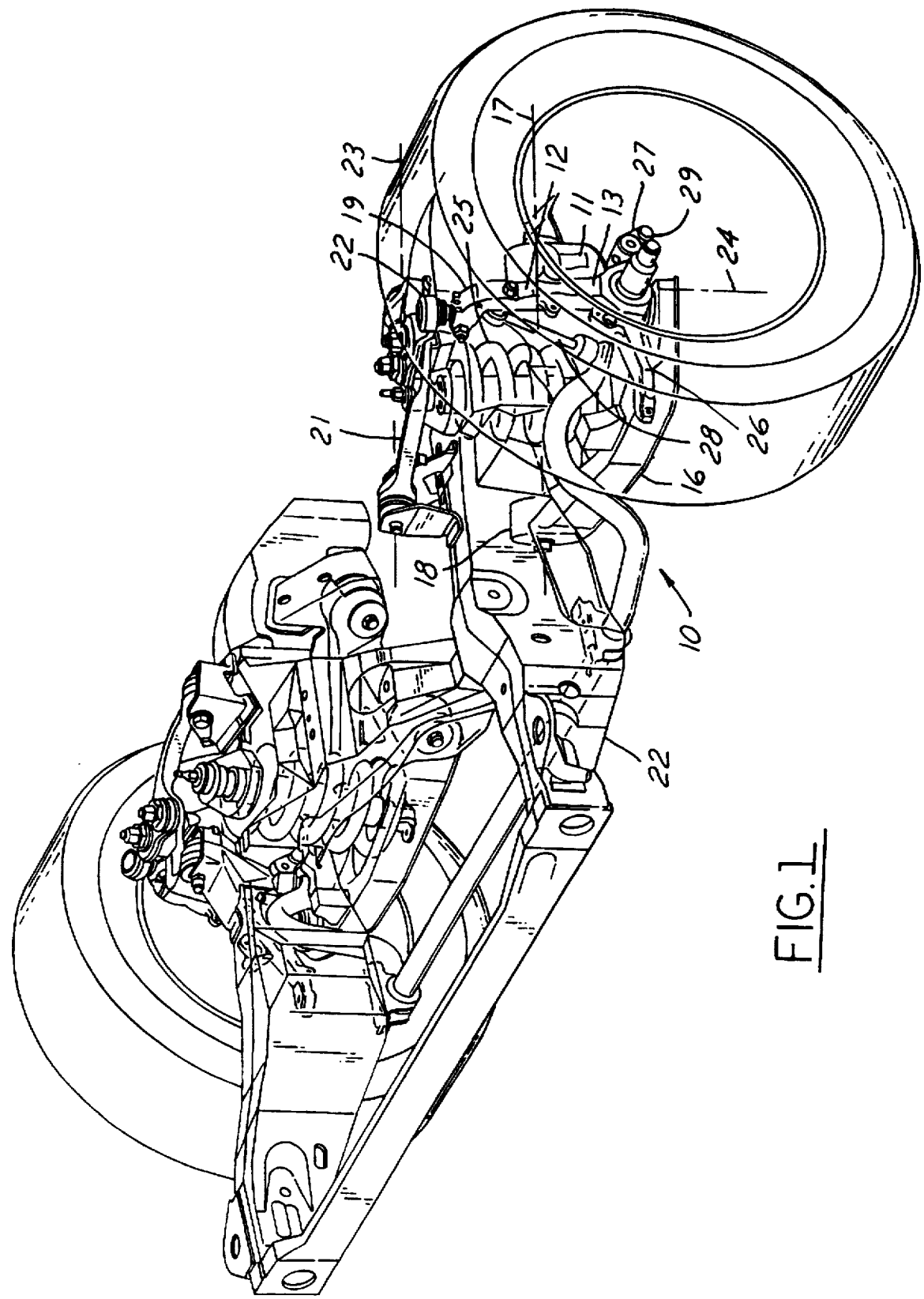
Figure 2:
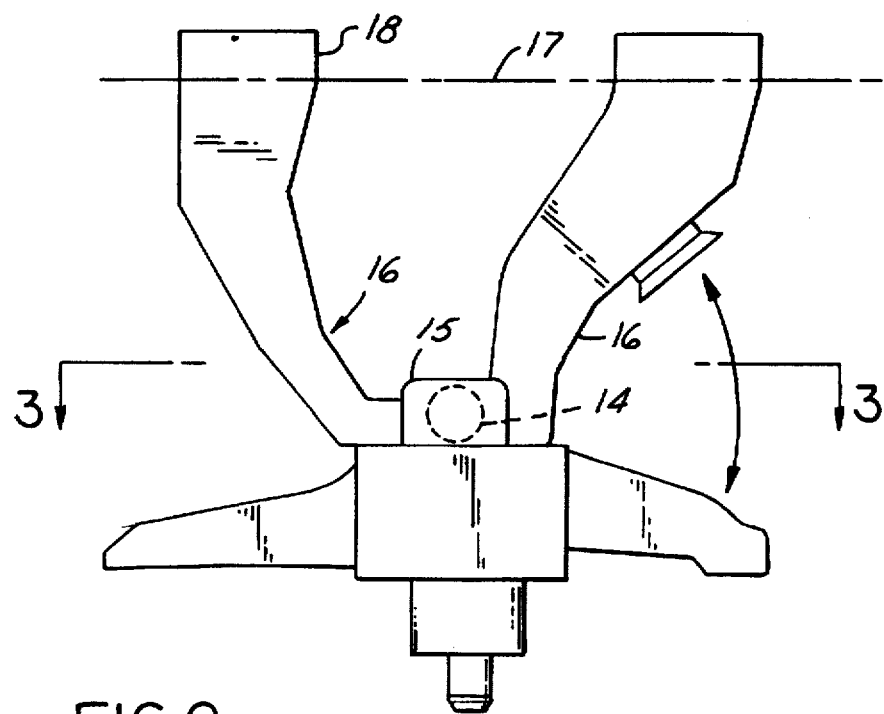
FIG. 2 is a plan view of a portion of the structure shown in FIG. 1 illustrating the range of movement of the spindle arm for the wheels as limited by the interengagement between the control arms and the suspension system.
Figure 3:
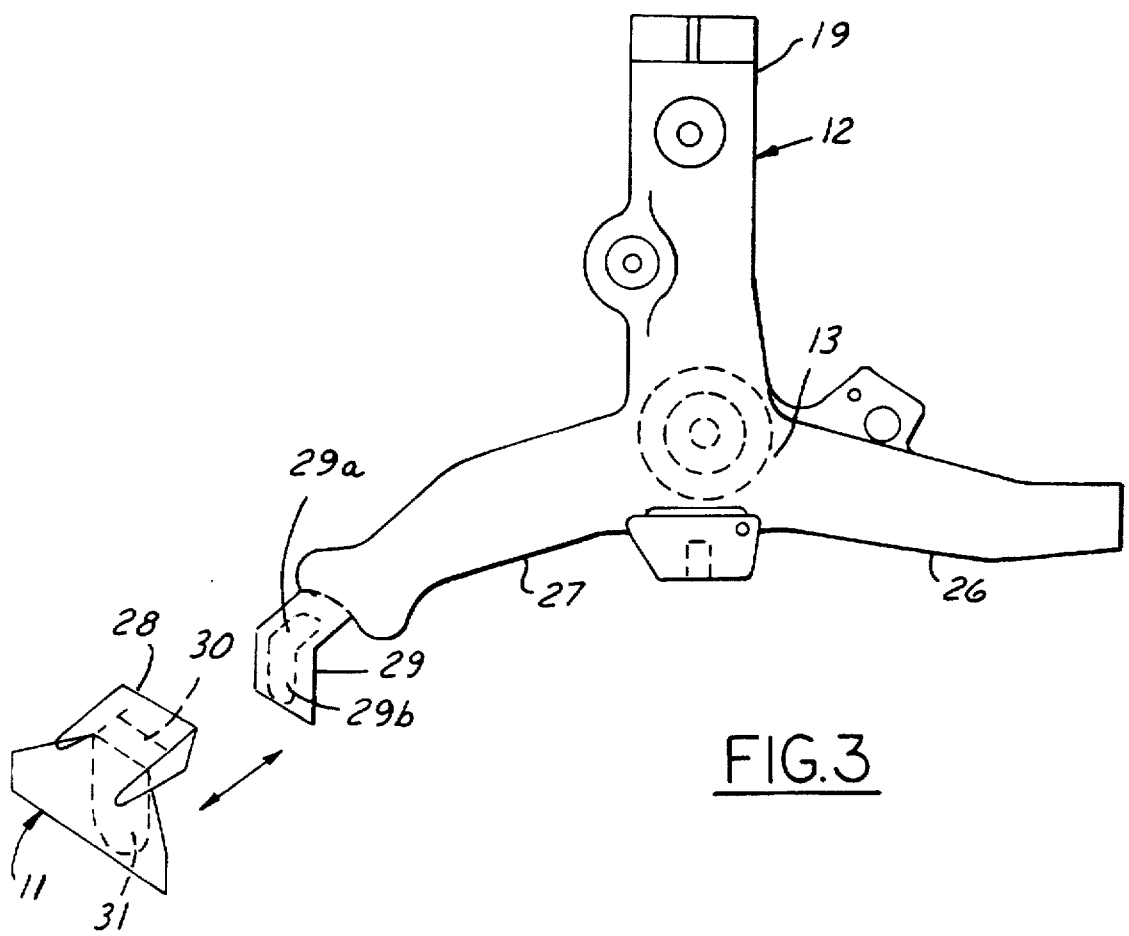
FIG. 3 is an elevational view of the structure shown in FIG. 2 taken along line 3—3 thereof.

As shown in FIGS. 1 and 2, the front end suspension assembly 10 on some current production automobiles use positive steering stops 11 to restrict the wheel spindle 12 during turning and suspension motion. The steel spindle 12 is attached to and supported for motion at the base of its neck 13 on a type of universal-motion ball-joint 14 carried on the extremities 15 of the lower control arm 16 which pivots about axis 17 at its other end 18 on vehicle frame 22. The upper end 19 of the spindle neck 13 is attached with a similar ball joint 20 to the upper control arm 21 which is attached to the frame 22 about a second axis 23. The weight of the vehicle is suspended by use of a spring and shock absorber assembly 25 acting between the control arms, providing an undulating motion on the spindle 12 when the vehicle is driven, which motion is essentially about a horizontal axis. Coordinated steering arms 28 for the front wheels rotate the spindle 12 about a more vertical disposed axis 24. The combination of these motions results in an articulating swivel motion of the spindle 12 including its spindle arms 26, 27. Turning and suspension motions of the end 29 of the spindle arm 27 is restricted by positive steering stop 11 which preferably is a bracket 28 attached to the lower arm 16 as a separate steel member that is preferably projection welded to the lower control arm 16, as shown in FIG. 1. Since the end 29 will experience an articulating swivel motion, the stop 11 must have a concave shape which at least possesses a surface 30 to limit horizontal motion about a vertical axis, and a surface 31 to limit the vertical motion about a horizontal axis. Metal to metal interengagement between the end 29 (which is often shaped as a nose having a convex shape with a surface 29a and a surface 29b) and stop 11 results in a scrubbing action of both surfaces 30–31 and nose surface 29a and 29b all of which are unlubricated; this can result in unwanted noise at the interengaging wear surfaces.

A wear resistant and noise suppressing coating 41 is applied to one or both interfacing surfaces by the following method. The interface surface 40 to be coated is prepared to present a fresh mechanical adherable stiff surface. This is carried out by cleaning and roughening of such surface to remove stamping oils and residual grease. Preferably it is only the bracket 28 that is prepared, first by washing and then by abrasive grit blasting, rough machining or equivalent roughening technique to ensure adequate coating adhesion. If the coating is a metallized self-bonding type, the roughening step may be eliminated.

After the cleaning and roughening step, the surface 40 of the bracket is thermally sprayed to provide a top coating 41 thereonto which consists of at least one of (i) a self-lubricating metal or metal alloy, and (ii) a compliant metal. The self-lubricating metal may consist of Tin (Sn) babbitt or bronze metal alloy. The babbitt may consist of zinc and tin in a proportion of 1 to 5 by weight. The bronze may be an aluminum bronze, silicon bronze or phosphor bronze, each containing 0.05–10 weight % of each alloy constituent (silicon bronze 5–10% Si, phosphor bronze 5–10% Sn, aluminum bronze 5–10% Al). Other tin containing metal alloys that may be utilized are 100% Tin (Sn), or 80% Sn/20% Zn or 90% Sn/7% Sb (antimony) 3% Cu. The compliant metal is selected from the group of zinc, aluminum or alloys of either one. For example, brass may be utilized comprising copper and zinc in the ratio of 1 to 3–20. Aluminum/zinc or aluminum/silicate alloys may be also utilized, or other aluminum or zinc alloys (containing 5–30% % by wt. alloyed with zinc). The reason a self lubricating metal is limited to that which desirably contains tin is that the presence of Tin, a known solid film lubricant will provide a low friction, compliant sliding surface coating. The reason that the compliant metal is preferably an alloy of aluminum is that such metals provide enhanced ductility.

Figure 4:
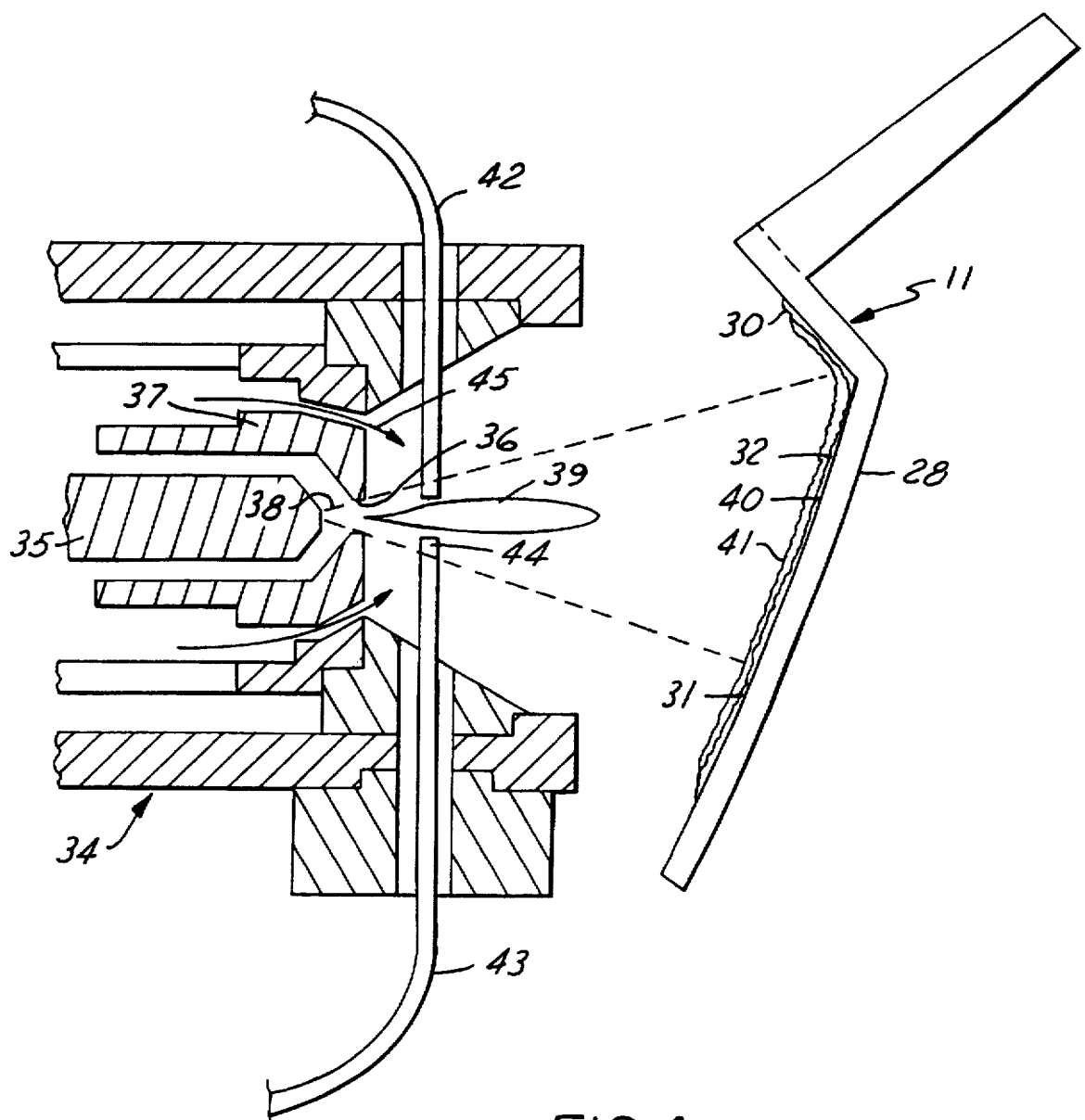
FIG. 4 is a highly enlarged schematic representation of how thermal spraying may be carried out to deposit the desired coating on the stop surfaces.

Desirably the thermal spraying step is carried out by wire arc spraying where the metals of the coating are introduced as wire feed stock which are used as consumable electrodes in a gun 34 as shown in FIG. 4. Gun 34 has a main cathodic electrode 35 pointing toward an opening 36 of an anodic nozzle 37. A main gas flow is ionized when it passes through an arc 38 established between the nozzle 37 and electrode 35 to provide an electric plasma arc stream 39. The arc is further transferred to the consumable electrodes 42, 43 and the electric plasma arc stream is extended and enhanced. A further gas shroud 45 is used to stabilize the spray of droplets from the metal wire tips 44.

The most cost effective spraying method is a two wire arc spraying system where the alloys are performed into wires. However, it is preferable to use two wires, each of different composition, where one of the consumable wires 42 is constituted of the self lubricating metal or metal alloy and the other consumable wire 43 is constituted of the compliant metal. The coating 41 is deposited in the thickness range of 0.002–0.02 inches as a top coating. The reason why a coating of less than 0.002 inches is not desired is because it may not provide a continuous coating due to the topographical nature of thermal spraying; and the reason why 0.02 inches is not exceeded in thickness is because excessive coating thickness leads to residual stress in the coating which can affect adhesion.

If enhanced adhesion is desired, a bond coat 32 can be used consisting of aluminum bronze alloys or nickel aluminum alloys, in a thickness range of 0.001–0.004 inches. In the case of aluminum and silicon bronzes, these material systems are both self bonding and can function as the top coat material making them particularly useful in this invention application.

Although the metals of the top coat material provide wear resistance and noise-vibration reduction such as the "bronze" alloys, in instances where corrosion resistance is a critical design criteria and must be further enhanced, the application of an intermediate layer of aluminum serves to protect the steel spindle 13 or steering stop 11 from cathodic corrosion associated with copper based coatings applied directly to the steel components.

The coating application does not require any post finishing operations or machining operations and can be used in the as deposited condition. However, one essential step must take place subsequent to the coating steps and that is placing the coated interface into service where it is subjected to repeated articulating swiveling contact that functions to microweld the coating to the supporting surface. This microwelding takes place by frictional forces acting to disrupt the native oxide layers between the substrate and coating and produces enhanced adhesion and a "smeared" surface layer across the contact areas.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

We claim:

1. An automotive steering assembly wherein the improvement consists of:
   (a) a steering spindle that articulatingly swivels about a ball joint fulcrum, the spindle carrying a spindle arm with a steel convex first stop surface at one extremity.
   (b) a resilient suspension control arm carrying a steel concave second stop surface effective to be scrubbing engaged by said first stop surface with a force of at least 5,000 psi; and
   (c) a thermally sprayed noise suppressing coating on at least one of said first or second stop surfaces, the coating consisting of at least one of (i) a self lubricating metal or metal alloy and (ii) a compliant metal.

2. The steering and suspension assembly as in claim 1, in which the self lubricating metal is selected from babbitt or bronze metals, and the compliant metal is selected from zinc, aluminum or alloys of either one.

3. The steering and suspension assembly as in claim 1, in which said thermally sprayed coating comprises a top and a bond coating, the top coating consisting of said self lubricating metal or metal alloy and the compliant metal, and the bond coating consisting of aluminum, bronze or nickel aluminum alloy.

4. The steering and suspension assembly as in claim 1, in which said thermally sprayed top coat contains copper, and the coating further comprises an intermediate aluminum coating in the thickness of 0.002 to 0.0054", disposed between the top coating and one of the supporting surfaces or bond coating.

5. The automotive and suspension system as in claim 1, in which said self-lubricating metal is effective to provide noise abatement, and said compliant metal is effective to provide enhanced wear resistance and coating adhesion.

6. A method of providing a durable noise suppressing coating on an articulating swiveling metal contact interface, comprising the steps of:
   (a) preparing the interface to present at least one fresh mechanically adherable stiff surface;
   (b) thermally spraying a top coating thereunto consisting of at least one of (i) a self lubricating metal, ceramic material or metal alloy, and (ii) a compliant metal; and
   (c) placing the coated interface into service to subject it to repeating articulating swiveling contact that functions to microweld the coating to said surface.

7. The method as in claim 6, in which said contact interface is comprised of steel or other iron based metal, and the force applied in step (c) is in excess of 5,000 psi.

8. The method as in claim 6, in which the thickness of said top coating, applied in step (b), is in the range of 0.002–0.02 inches.

9. The method as in claim 6, in which said self lubricating metal is selected from babbitt alloys (containing up to 20% Zn) or bronze metals (containing 5–10% silicon, 5–10% Tin, or 5–10% aluminum as major alloying elements).

10. The method as in claim 6, in which said compliant metal is selected from zinc, aluminum or alloys of each.

11. The method as in claim 6, in which, prior to step (b), a thermally sprayed bond coating of nickel-aluminum is applied in the thickness range of 0.0004–0.002 inches to enhance adhesion between the top coating and contact interface.

12. The method as in claim 6, in which said coating consists of copper based bronze alloys and the method further comprises providing a thermally sprayed aluminum intermediate coating in a thickness of 0.002 inches, which coating is disposed between the top coating and one of the interfaces or bond coating.

13. The method as in claim 6, in which thermal spraying is carried out by use of at least one of plasma, flame or wire arc, and wherein the droplets of the coating materials are impelled against the interface at a velocity of at least 50–300 meters per second.

14. The method as in claim 13, in which said thermal spraying is carried out by two wire arc spraying technique where one of the wires contains tin and the other wire contains aluminum or zinc.

* * * * *